(12) United States Patent
Zhao et al.

(10) Patent No.: US 6,598,189 B1
(45) Date of Patent: Jul. 22, 2003

(54) METHOD AND APPARATUS FOR DETERMINING THE RATE AND QUALITY OF RECEIVED DATA IN A VARIABLE RATE DIGITAL COMMUNICATION SYSTEM

(75) Inventors: Wen Zhao, Kanata (CA); Robert Charles Elliott, Alberta (CA); Xin Jin, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/560,648

(22) Filed: Apr. 28, 2000

(51) Int. Cl.⁷ .................. G06F 11/00; H04B 17/00
(52) U.S. Cl. .............. 714/708; 714/704; 714/774; 375/225
(58) Field of Search ................. 714/708, 774, 714/704; 375/225

(56) References Cited

U.S. PATENT DOCUMENTS

| | | | | |
|---|---|---|---|---|
| 5,566,206 A | | 10/1996 | Butler et al. ............ | 375/225 |
| 5,751,725 A | * | 5/1998 | Chen ..................... | 714/708 |
| 5,764,651 A | * | 6/1998 | Bullock et al. .......... | 714/708 |
| 5,774,496 A | * | 6/1998 | Butler et al. ............ | 375/225 |
| 5,850,405 A | * | 12/1998 | Wimmer et al. ......... | 714/790 |
| 5,968,154 A | * | 10/1999 | Cho ..................... | 710/119 |
| 6,094,465 A | * | 7/2000 | Stein et al. ............. | 375/346 |
| 6,108,811 A | * | 8/2000 | Nakamura et al. ....... | 714/795 |
| 6,141,353 A | * | 10/2000 | Li ....................... | 370/465 |
| 6,175,590 B1 | * | 1/2001 | Stein .................... | 375/225 |
| 6,182,252 B1 | * | 1/2001 | Wong et al. ............ | 714/708 |
| 6,209,046 B1 | * | 3/2001 | Sato et al. .............. | 710/22 |
| 6,233,708 B1 | * | 5/2001 | Hindelang et al. ....... | 714/747 |
| 6,424,631 B1 | * | 7/2002 | Czaja et al. ............ | 370/252 |

* cited by examiner

Primary Examiner—Albert Decady
Assistant Examiner—Anthony Whittington (57) ABSTRACT

A method of determining the actual transmission rate in a variable transmission rate communication system is provided, using error detection metrics. The received symbols are decoded assuming each possible rate, and then re-encoded to determine a symbol error rate for each possible rate. The possible transmission rates are then narrowed down using a simple measure of the likelihood of error, such as the CRC status determined for each rate. The symbol error rates are compared to either make a confident decision as to the actual transmission rate or to erase the frame. Rather than compare the values of the symbol error rates with predetermined thresholds, the method compares the differences between the symbol error rates for each possible rate with predetermined thresholds. This results in fewer erasures, even if the symbol error rates are low due to high signal to noise ratios.

39 Claims, 5 Drawing Sheets

METHOD AND APPARATUS FOR DETERMINING THE RATE AND QUALITY OF RECEIVED DATA IN A VARIABLE RATE DIGITAL COMMUNICATION SYSTEM

FIELD OF THE INVENTION

This invention relates to variable rate digital communication systems, and more particularly to the determination of the rate in a such systems.

BACKGROUND OF THE INVENTION

In code division multiple access (CDMA) communication systems, a transmitting system transmits data to a receiving system. Within the transmitting system, a data source sends a stream of data frames to a Cyclic Redundancy Check (CRC) and tail bit generator. The generator generates a set of CRC bits for each data frame, which are attached to the data frame for use in error detection by the receiving system. The data frames are then sent to an encoder which encodes the data as symbols. The symbols are then interleaved, modulated, and transmitted as a signal to the receiving system. Within the receiving system, the stream of symbols are demodulated, combined with the symbols of the same signal which travelled along a different propagation path, and de-interleaved. The resulting re-ordered stream of symbols is then passed to a decoder, which outputs a decoded data frame and performs a CRC check.

If the data being transmitted is voice data, a user does not require continual full use of the system. For example, there will be times when the user is not speaking. Therefore variable transmission rates are often used to reduce the number of symbols transmitted, thereby saving power. For example, in IS-95 networks four transmission rates are used. When a user is speaking, the transmission rate is at a full rate. When a user is not speaking, the transmission rate is at an eighth rate, equal to one eighth of the full rate. During transition between full rate and eighth rate the data may be transmitted at a half rate (equal to one half of the full rate) and at a quarter rate (equal to one quarter of the full rate).

In order to accurately decode the transmitted signal, the decoder must know the rate at which the symbols were actually transmitted. However this information is not transmitted with the symbols, and a processor within the receiving system must attempt to determine the actual transmission rate. There are three possible results when attempting to determine the transmission rate. The processor may determine the correct rate, may determine an incorrect rate, or may be unable to determine a rate. If the processor is unable to determine a rate the symbols are dropped, resulting in an erasure of the decoded data frame. It may be preferable to erase a decoded data frame if the processor is not confident enough that it has determined the actual transmission rate, because sending a decoded data frame based on an incorrect transmission rate can result in the receiving user being exposed to unpleasant noise.

Error detection metrics can be used to assist in the attempt to determine the correct rate, as disclosed in U.S. Pat. No. 5,566,206 issued to Butler et al. on Oct. 15, 1996. A decoder is used for each possible transmission rate to generate a decoded frame for each possible transmission rate, each of which is stored in a buffer. Error detection techniques are then applied to each decoded frame to determine various error detection metrics for each rate. Possible error detection metrics are the CRC status, the Symbol Error Rate (SER), and the Yamamoto value. A comparison of the error detection metrics allows the processor to make a decision as to which of the possible rates was most likely used in the transmission. If a decision is made, the processor signals the appropriate buffer and the decoded frame corresponding to that rate is passed on to the receiving user. Otherwise, if the error correction parameters are such that the processor cannot make a decision as to which is the correct rate, then the data frame is erased.

U.S. Pat. No. 5,751,725 issued to Chen on May 12, 1998 discloses one such method of determining the rate in a variable transmission rate system. The processor determines whether the CRC statuses for exactly two of the decoded frames are positive. If so, the processor compares the SERs for these two decoded frames after applying a linear function to one of the two SERs. The parameters of the linear function are predetermined empirically, and are necessary to correct for normalization of the SERs and for the differences in probability of a positive CRC status for different transmission rates. The comparison of the SERs reveals which of the two rates is more likely to be the actual transmission rate. The SER for the decoded frame whose rate is most likely to be the actual transmission rate is then compared with a maximum threshold SER for that rate (predetermined empirically based on the desired performance). If the SER is below the maximum threshold, then the processor assumes that the determined rate is the actual transmission rate and signals the buffer to send the corresponding decoded frame to the receiving user. If the SER is above the maximum threshold, then the processor is not confident that it has found the actual transmission rate. An erasure is signalled, and no decoded frame is sent to the receiving user.

If the CRC status of exactly one decoded frame is positive, then the processor begins by assuming that the rate corresponding to that frame is most likely to be the actual transmission rate but must then reassure itself that the rate is most likely the actual transmission rate. The processor compares the SER of the decoded frame for which the CRC status was positive with a maximum threshold SER for the rate corresponding to the decoded frame. If the SER of the frame is above the maximum threshold SER, then the frame is erased. If the SER of the frame is below the maximum threshold SER, then this is additional confirmation that this decoded frame was decoded using the correct rate. However, as further checks the processor compares the SERs of each of the other decoded frames with a minimum threshold SER. A minimum threshold SER is determined empirically for each combination of two different rates, so in a communication system using four possible rates there are twelve minimum threshold SERs. If the SER of any of the other decoded frames is less than the minimum threshold SER, then it is quite possible that the rate of the other decoded frame was the actual transmission rate. The uncertainty as to which of the two rates (the rate indicated by the positive CRC status or the rate indicated by the low SER) is most likely to be the actual transmission rate results in an erasure of the data frame by the processor.

One disadvantage of the method disclosed in U.S. Pat. No. 5,751,725 is that it compares absolute SERs with predetermined minimum thresholds. Under certain conditions the signal to noise ratio of the transmitted signal can be particularly high. When this occurs the SERs determined for more than one transmission rate may be low and there is a good chance that more than one will fall below the minimum relevant threshold SER. The method disclosed in U.S. Pat. No. 5,751,725 would then result in a high number of unnecessary erasures. A method of determining the transmission rate which does not result in these unnecessary erasures would provide more a complete signal to the receiving user.

SUMMARY OF THE INVENTION

The present invention provides a method for determining at a receiving system an actual transmission rate in a communication system having a transmitting system which transmits a frame to the receiving system. The frame is transmitted at the actual transmission rate which can be one of several possible transmission rates. The receiving system generates an error check value for each possible transmission rate and an error rate value for each possible transmission rate. If exactly two error check values are positive, one error check value having a corresponding first error check rate and the other error check value having a corresponding second error check rate, a difference between the first error rate value and the second error rate value is calculated. If the difference is less than a first predetermined threshold, a signal is generated to indicate that the actual transmission rate is the possible transmission rate corresponding to the first error rate value. Otherwise, if the difference between the first error rate value and the second error rate value is greater than a second predetermined threshold a signal is generated to indicate that the actual transmission rate is the possible transmission rate corresponding to the second error rate value. If the difference between the first error rate value and the second error rate value is greater than the first predetermined threshold and less than the second predetermined threshold, a signal is generated to erase the frame.

If exactly one of the error check values is positive, then the error rate value corresponding to the error check value which was positive is compared with each of the error rate values corresponding to the error check values which were negative. If each difference between the error rate value corresponding to the error check value which is positive and an error rate value corresponding to an error check value which is negative is less than a predetermined threshold particular to the two possible transmission rates corresponding to the error check value which was positive and the error check value which was negative, a signal is generated to indicate that the actual transmission rate was the possible transmission rate corresponding to the error check value which was positive. Otherwise, a signal is generated to erase the frame.

If other than exactly two of the error check values are positive and other than exactly one of the error check values is positive, a signal is generated to erase the frame.

This method determines erasures by comparing the differences between error rate values (most likely SERs) with predetermined thresholds rather than comparing the error rate values themselves with predetermined thresholds. This results in fewer unnecessary erasures.

The steps carried out if exactly two error check values (most likely CRCs) is positive and the steps carried out if exactly one error check value is positive can be implemented separately and still result in fewer unnecessary erasures.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The invention will now be described in greater detail with reference to the accompanying diagrams, in which.

DETAILED DESCRIPTION OF THE PREFERRED EMBODIMENTS

Figure 1:
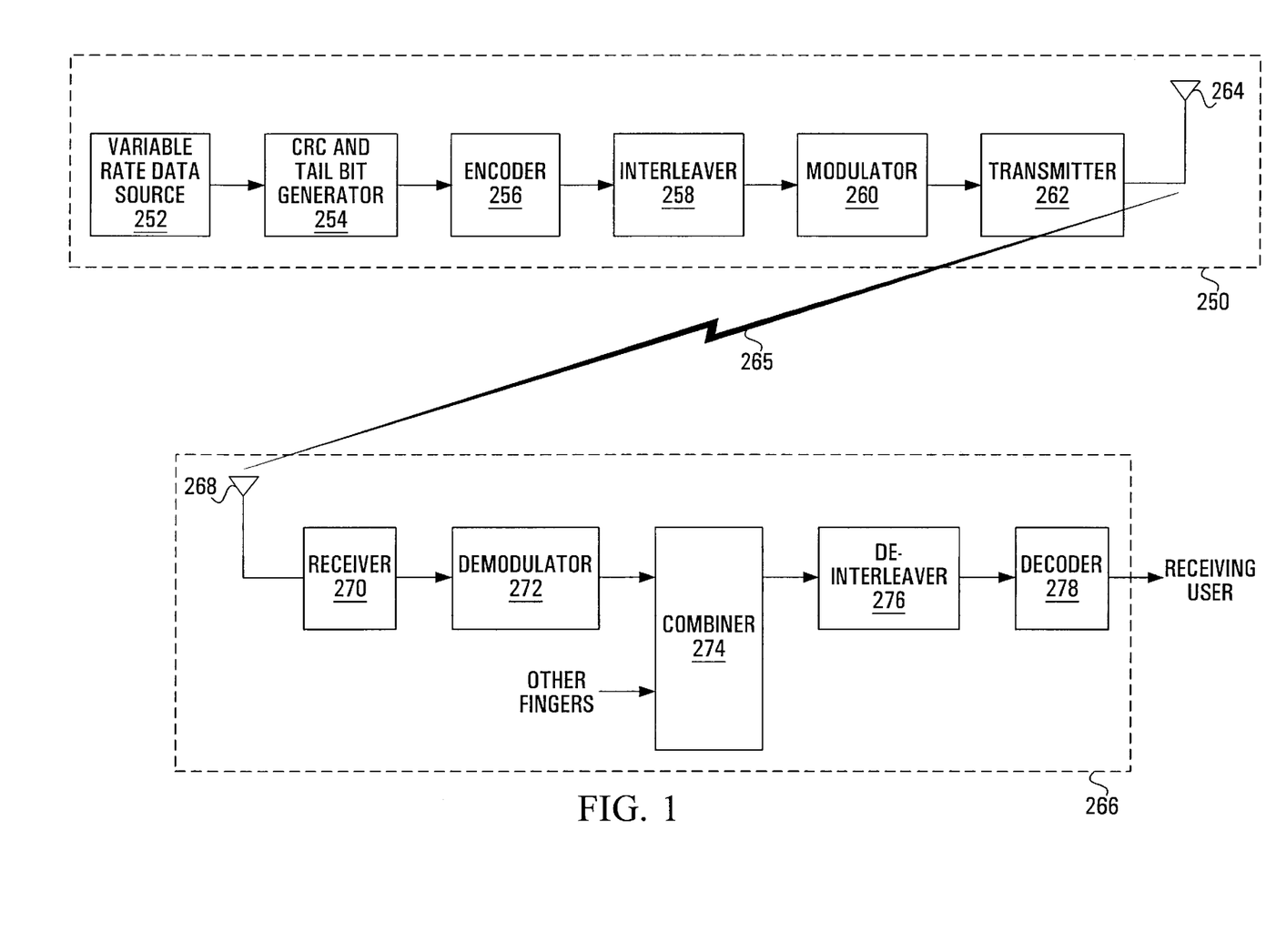
FIG. 1 is a block diagram of a variable rate communication system.
Figure 2:
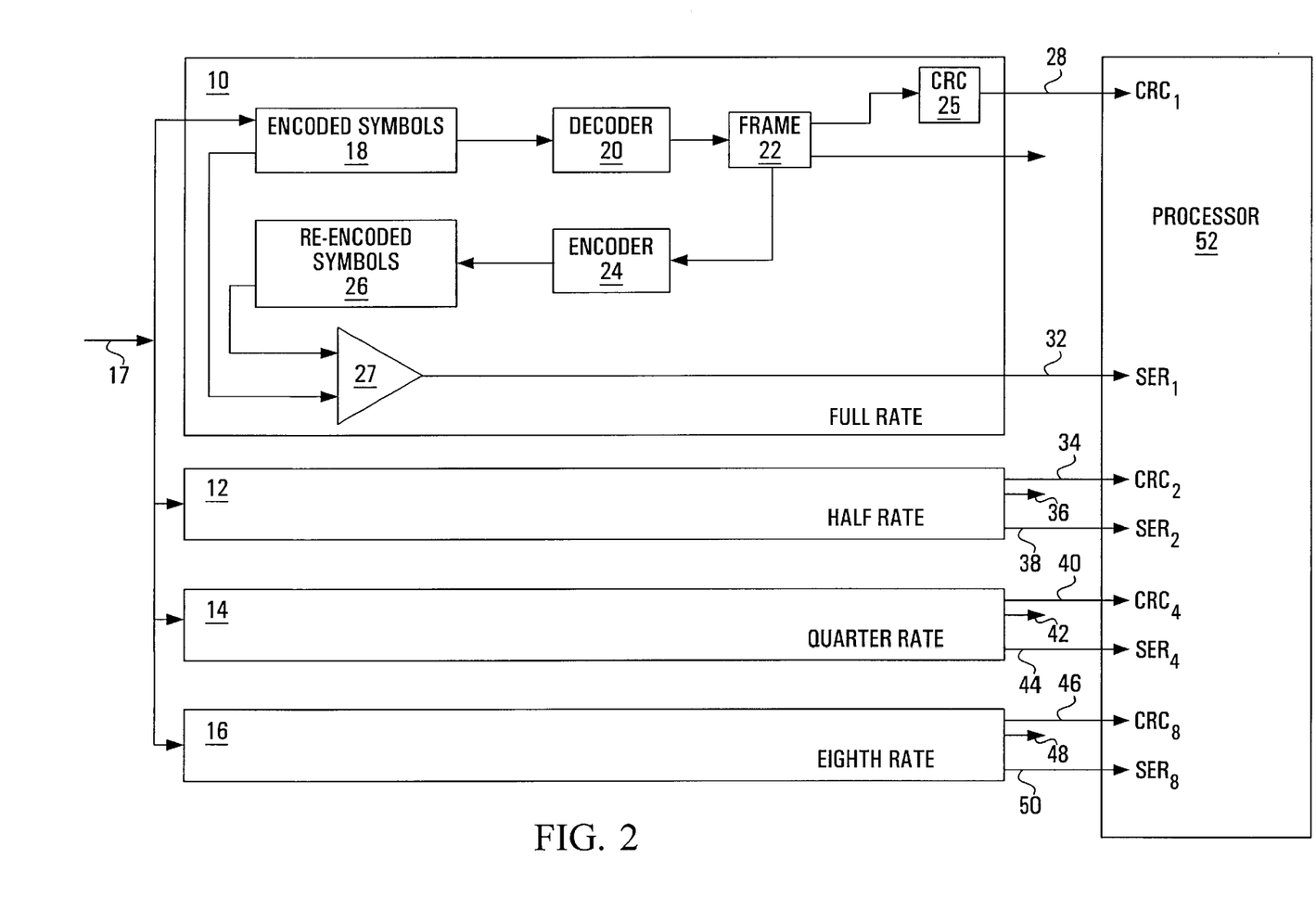
FIG. 2 is a block diagram showing the data flow following the de-interleaving of the transmitted symbols for a transmission system having four possible transmission rates.

FIG. 1 shows a CDMA communication system, in which a transmitting system 250 sends a signal 265 in the form of a stream of symbols to a receiving system 266 at an actual transmission rate which is one of several possible transmission rates. Within the receiving system, the symbols are received by an antenna 268 and receiver 270, demodulated at 272, combined at 274 with the symbols of the same signal which travelled along a different propagation path, and de-interleaved at 276. The resulting re-ordered stream of symbols is then passed to a decoder system 278. The decoder system 278 is shown in greater detail in FIG. 2. The re-ordered stream of symbols 17 is passed to each of several decoder blocks 10, 12, 14 and 16, one decoder block for each possible transmission rate. In FIG. 2, and in what will be described hereafter, there are four possible transmission rates: a full rate, a half rate which is one half of the full rate, a quarter rate which is one quarter of the full rate, and an eighth rate which is one eighth of the full rate. This is in accordance with the Telecommunication Industry Association's IS-95 Standard. The half rate decoder block 12, the quarter rate decoder block 14, and the eighth rate decoder block 16 contain the same components as the full rate decoder block 10, although as will be described below some of the components function slightly differently in each decoder block.

Within the full rate decoder block 10 the stream of symbols 18 is passed to a Viterbi decoder 20. The decoder 20 decodes the stream of symbols 18 assuming that the actual transmission rate was equal to the full rate. The decoder 20 produces as output a decoded frame 22. The decoded frame 22 is passed to a CRC circuit 25 which determines a CRC status of the decoded frame 22. The CRC circuit 25 passes a CRC status bit ($CRC_1$) 28, whose value depends on the CRC status of the decoded frame 22, to a processor 52.

The decoded frame 22 is also passed to an encoder 24, which assumes the actual transmission rate was equal to the full rate and re-encodes the decoded frame 22 to produce re-encoded symbols 26. A comparator 27 compares the received symbols 18 with the re-encoded symbols 26 to determine a Symbol Error Rate ($SER_1$) 32. The more differences there are between the received symbols 18 and the re-encoded symbols 26, the higher will be the SER 32.

The decoded frame 22 is also passed to a buffer (not shown).

The half rate decoder block 12 performs the same functions as the full rate decoder block 10, except that the Viterbi decoder 20, the re-encoder 24, and the comparator 27 assume that the transmission rate was equal to the half rate. The comparator 27 also normalizes the SER. The normalization is necessary because there are fewer re-encoded symbols 26 if the re-encoder 24 assumes a lower transmission rate, and this will result in a lower SER in the half rate decoder block even if the proportion of inconsistent symbols is the same in the half rate decoder block 12 as in the full rate decoder block 10. The normalization is accomplished simply by multiplying the SER determined in the half rate decoder block 12 by the full rate and dividing by the half rate. The normalized SER (SER$_2$) 38 determined in the half rate encoder block is passed to the processor 52, along with the CRC status bit (CRC$_2$) 34 determined based on the half rate. The decoded frame 36 produced by the Viterbi decoder 20 using the half rate is passed to the buffer.

Similarly, the quarter rate decoder block 14 sends a normalized SER (SER$_4$) 44 and a CRC status bit (CRC$_4$) 40 to the processor 52, where SER$_4$ 44 and CRC$_4$ 40 are determined using the quarter rate. The decoded frame 42 produced by the Viterbi decoder 20 using the quarter rate is passed to the buffer.

Finally, the eighth rate decoder block 16 sends a normalized SER (SER$_8$) 50 and a CRC status bit (CRC$_8$) 46 to the processor 52, where SER$_8$ 50 and CRC$_8$ 46 are determined using the eighth rate. The decoded frame 48 produced by the Viterbi decoder 20 using the eighth rate is passed to the buffer.

Figure 3:
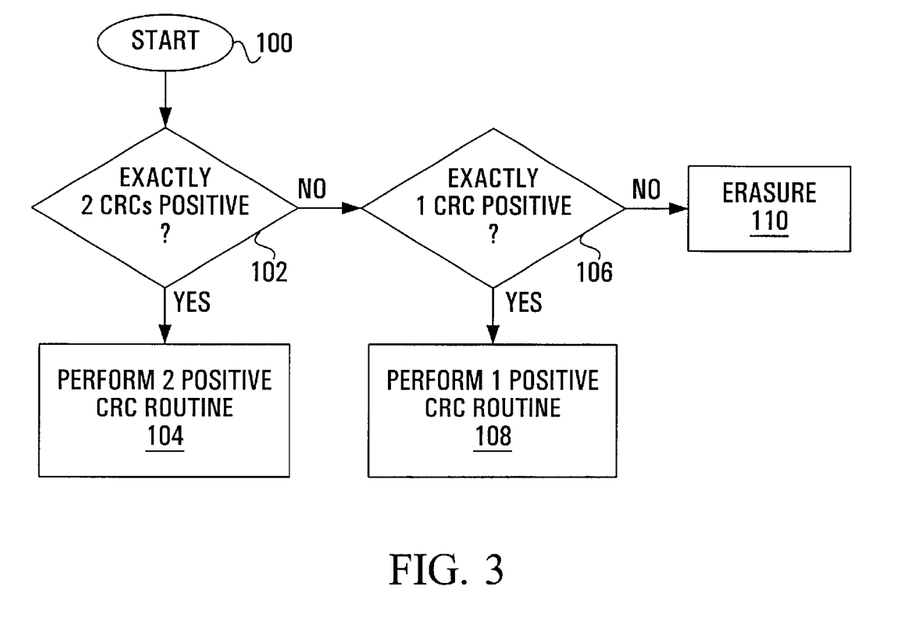
FIG. 3 is a flowchart showing high level steps in the rate determination method of the invention.

The processor 52 compares the error detection metrics (consisting of CRC$_1$ 28, CRC$_2$ 34, CRC$_4$ 40, CRC$_8$ 46, SER$_1$ 32, SER$_2$ 38, SER$_4$ 44, and SER$_8$ 50) to determine a rate or, if unable to determine a rate with confidence, to determine that an erasure should occur. The high level routine is shown in FIG. 3. The routine starts 100 when it receives a complete set of error detection metrics. If the processor determines at step 102 that exactly two CRC statuses were positive (as indicated by the values of CRC$_1$ 28, CRC$_2$ 34, CRC$_4$ 40, CRC$_8$ 46), then a routine for two positive CRC statuses is carried out at step 104 (described in more detail in FIG. 4). If the processor determines at step 102 that other than exactly two CRC statuses were positive, then the processor determines at step 106 whether exactly one CRC status was positive. If exactly one CRC status was positive, then a routine for one positive CRC status is carried out at step 108 (described in more detail in FIG. 5). If the processor determines at step 106 that other than exactly one CRC status was positive, then the processor signals the buffer to erase the data frame at step 110. An erasure is requested because either zero, three, or four CRC statuses were positive and the processor is unable to determine the actual transmission rate with any certainty.

Figure 4:
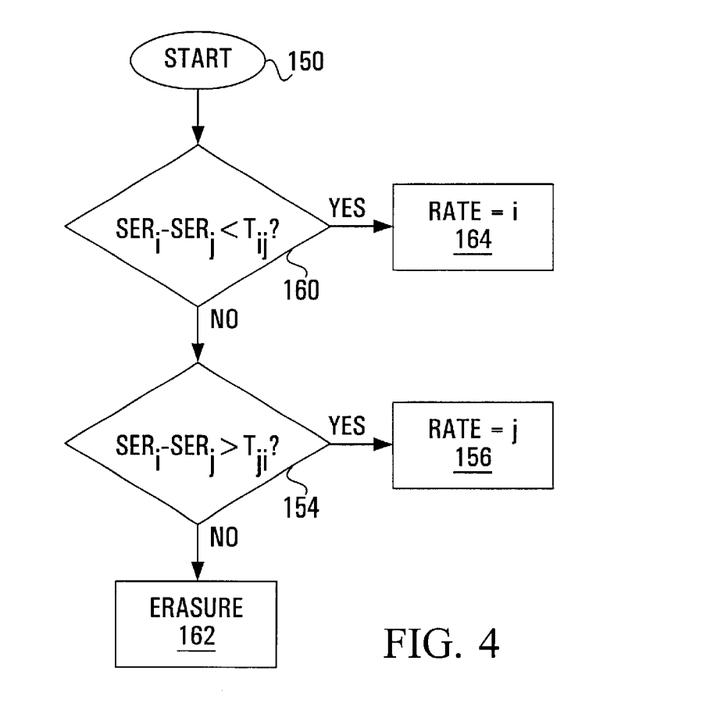
FIG. 4 is a flowchart showing detailed steps in the rate determination method of the invention when exactly two decoded frames have positive CRC statuses.

FIG. 4 shows step 104, the routine carried out when exactly two CRC statuses are positive, in greater detail. The routine starts 150 if the processor determines that exactly two CRC statuses were positive at step 102 in FIG. 3. In FIG. 4 the two rates for which the CRC statuses were positive are represented by subscripts i and j. If the processor determines at step 160 that the difference between SER$_i$ (the SER measured assuming a transmission rate of i) and SER$_j$ (the SER measured assuming a transmission rate of j) is less than a threshold T$_{ij}$, then the processor assumes at step 164 that the rate at which the symbols were transmitted is i. The threshold T$_{ij}$, and all thresholds used in the method of the invention, may be positive or negative and are predetermined empirically based on desired performance. If the difference at step 160 is greater than T$_{ij}$, then the processor determines at step 154 whether the difference between SERi and SERj is greater than a threshold T$_{ji}$. T$_{ji}$ is predetermined empirically based on desired performance and may be positive or negative, but will not be greater than T$_{ij}$. If the difference at step 154 is greater than T$_{ji}$ then processor assumes at step 156 that the rate at which the symbols were transmitted is j. If the difference at step 160 is greater than T$_{ij}$ and the difference at step 154 is less than T$_{ji}$, then the two values of SER were close enough that the processor is uncertain which is the correct rate, and an erasure occurs at step 162.

The thresholds are determined empirically based on the desired performance of the communication system, and will depend on the rates for which the SERs are being compared. For example, given an acceptable wrong decision rate and an acceptable erasure rate, the thresholds when i represents the quarter rate and j represents the eighth rate may be determined empirically to be T$_{ij}$=−10 and T$_{ji}$=20. Suppose for a particular set of symbols SER$_i$ is determined to have a value of 30. If SER$_j$ is determined to have a value of 50, then the difference at step 160 is less than T$_{ij}$ and the rate is assumed to be i (the quarter rate in this example) at step 164. If SER$_j$ is determined to have a value of 5, then the difference at step 160 is greater than T$_{ij}$. The difference at step 154 is greater than T$_{ji}$ and the rate is assumed to be j (the eighth rate in this example) at step 156. Finally, if SER$_j$ is determined to have a value of 20, then the difference is greater than T$_{ij}$ and less than T$_{ji}$, and an erasure will occur at step 162.

It should be noted that counter-intuitive results can occur if T$_{ij}$>0. With values of T$_{ij}$=20, SER$_i$=40, and SER$_j$=30, then the rate would be assumed to be i even though the SER for rate i was larger than the SER for rate j. However this may be reasonable if rate i is much more likely to occur statistically than rate j. If both CRC$_i$ and CRC$_j$ are positive, then rate i is preferred unless SER$_i$ is significantly higher than SER$_j$. This will be reflected in the empirical determination of T$_{ij}$.

Figure 5:
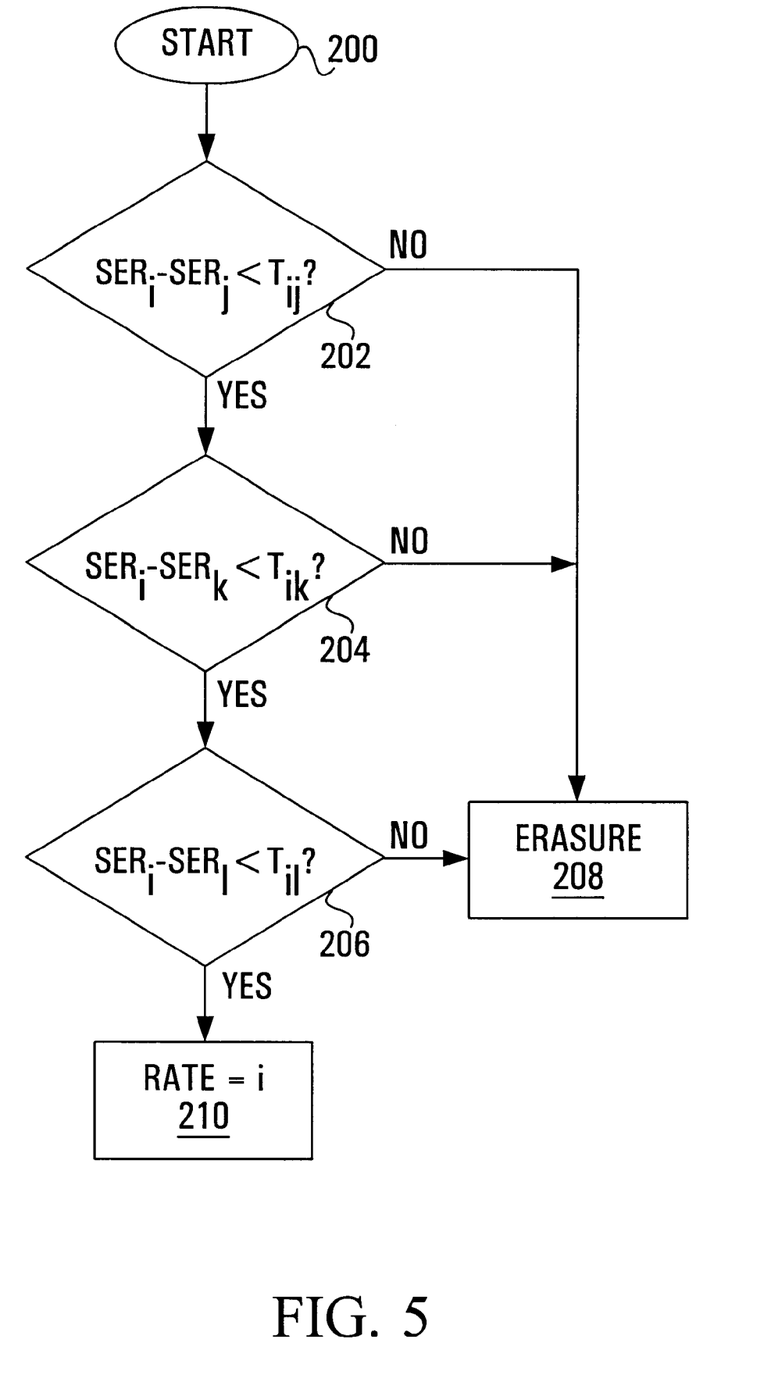
FIG. 5 is a flowchart showing detailed steps in the rate determination method of the invention when exactly one decoded frame has a positive CRC status.

FIG. 5 shows step 108, the routine carried out when exactly one CRC status is positive, in greater detail. The routine starts 200 if the processor determines that exactly one CRC status was positive at step 106 in FIG. 3. In FIG. 5, the rate which had a positive CRC status is represented by the subscript i, and the other rates are represented by the subscripts j, k, and l. The processor determines at step 202 whether the difference between SER$_i$ and SER$_j$ is less than a threshold T$_{ij}$. If the difference is greater than the threshold T$_{ij}$ then there is one error detection metric, CRC$_i$, indicating that the rate should be i and one error detection metric, SER$_j$, indicating that the rate should be j. The processor is unable to determine the rate with any certainty, and an erasure occurs at step 208. If the processor determines at step 202 that the difference between SER$_i$ and SER$_j$ is less than the threshold T$_{ij}$, then the processor carries out similar comparisons between SER$_i$ and SER$_k$, and between SER$_i$ and SER$_l$ at steps 204 and 206 respectively. In each case, if SER$_i$ is not sufficiently less than the SER for the other rate then the processor signals an erasure at step 208. If SER$_i$ is sufficiently less than the SER for all three of the other rates, then the processor is confident at step 210 that the rate is i.

Figure 6:
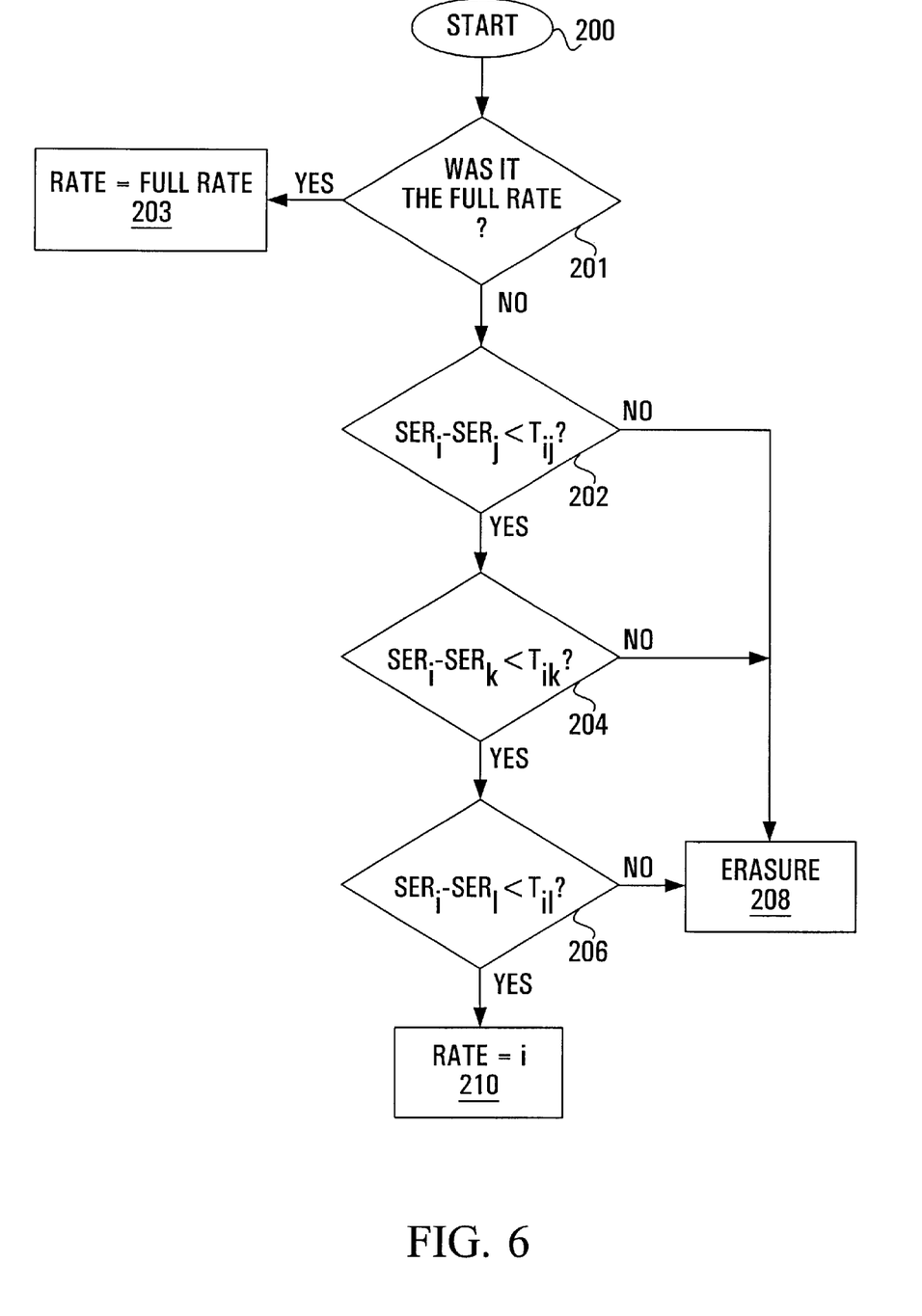
FIG. 6 is a flowchart showing detailed steps in an alternate embodiment of the rate determination method of the invention when exactly one decoded frame has a positive CRC status.

FIG. 6 shows alternative steps to those shown in FIG. 5. These alternative steps can shorten the execution time of the rate determination by assuming that the CRC status for the full rate is much more likely to be accurate since there are more symbols present for the full rate. The processor first determines at step 201 whether the rate for which the CRC status was positive was the full rate. If so, then the processor is confident at step 203 that the rate is the full rate, without needing to carry out comparisons between the SERs. If the processor determines at step 201 that the rate for which the CRC status was positive was not the full rate, then the processor carries out the same steps as in FIG. 5, as described above.

When the processor determines that an erasure should occur, either because no CRC statuses were positive, more than two CRC statuses were positive, or because of ambiguity between the rate suggested by the CRC statuses and the rate suggested by the SERs, then the processor signals the buffer to erase the decoded frames produced by the Viterbi decoder 20 in each decoder block. If the processor is able to determine a rate with confidence, then the processor signals the buffer to send the decoded frame corresponding to that rate to the receiving user.

Although the methods described use the CRC status to determine which further steps to carry out, the CRC status is merely the most conventional error detection metric. Since the purpose of the CRC status is to screen out unlikely rates, other single bit error detection metrics could be used as error check values. For example, the processor could determine at step 102 in FIG. 3 whether exactly two rates have a positive Yamamoto bit, and could determine at step 106 whether exactly one rate has a positive Yamamoto bit.

The method has been described with reference to a version of a CDMA system having four possible transmission rates. Future versions of CDMA systems which employ more than four possible transmission rates are also within the scope of the invention. In such systems, FIG. 5 would be extended by comparing the SER for the rate for which the CRC status was positive with the SERs for the additional rates. If the difference between $SER_i$ and the SER for any of the other possible rates is greater than a predetermined threshold (there being a threshold for each combination of two rates) then the processor signals an erasure. The scope of the invention is also not limited to CDMA systems. The invention can be used in any variable transmission rate communication system in which an error check value (such as the CRC) and an error rate value (such as the SER) can be determined for each possible transmission rate.

The steps carried out if exactly two error check values (most likely CRCs) is positive and the steps carried out if exactly one error check value is positive can be implemented separately and still result in fewer unnecessary erasures.

What has been described is merely illustrative of the application of the principles of the invention. Other arrangements and methods can be implemented by those skilled in the art without departing from the spirit and scope of the present invention. In particular, other methods which are logically equivalent to the methods described are within the scope of the invention.

We claim:

1. In a communication system having a transmitting system which transmits a frame to a receiving system, the frame being transmitted at an actual transmission rate which is one of a plurality of possible transmission rates, the receiving system generating an error check value for each possible transmission rate and an error rate value for each possible transmission rate, a method for determining at the receiving system the actual transmission rate comprising the steps of:

determining whether exactly two error check values are positive, one error check value having a corresponding first error check rate and the other error check value having a corresponding second error check rate, and if so, the further steps of:

determining whether the difference between the first error rate value and the second error rate value is less than a first predetermined threshold; and if the difference between the first error rate value and the second error rate value is less than the first predetermined threshold, generating a signal to indicate that the actual transmission rate is the possible transmission rate corresponding to the first error rate value, and otherwise, the further steps of:

determining whether the difference between the first error rate value and the second error rate value is greater than a second predetermined threshold; and if the difference between the first error rate value and the second error rate value is greater than the second predetermined threshold, generating a signal to indicate that the actual transmission rate is the possible transmission rate corresponding to the second error rate value, and otherwise, the further step of:

generating a signal to erase the frame;

if other than exactly two of the error check values are positive, determining whether exactly one of the error check values is positive, and if so, the further steps of:

for each of the error rate values corresponding to an error check value which is negative, determining whether the difference between the error rate value corresponding to the error rate value which is positive and the error rate value corresponding to the error check value which is negative is less than a predetermined threshold particular to the two possible transmission rates corresponding to the error check value which is positive and the error check value which is negative; and if each difference between the error rate value corresponding to the error check value which is positive and an error rate value corresponding to an error check value which is negative is less than the predetermined threshold particular to the two corresponding rates, generating a signal to indicate that the actual transmission rate was the possible transmission rate corresponding to the error check value which was positive, and otherwise, the further step of:

generating a signal to erase the frame;

if other than exactly two of the error check values are positive and other than exactly one of the error check values is positive, generating a signal to erase the frame.

2. The method of claim 1 wherein the error check values are cyclic redundancy check values.

3. The method of claim 1 wherein the error check values are Yamamoto check values.

4. The method of claim 1 wherein each of the thresholds is predetermined empirically based on a desired performance of the communication system, there being two such thresholds for each combination of possible transmission rates.

5. The method of claim 1 wherein the communication system is a code division multiple access communication system.

6. The method of claim 5 wherein the error rate values are symbol error rates.

7. The method of claim 5 wherein the error rate values are normalized symbol error rates.

8. The method of claim 5 wherein the error check values are cyclic redundancy check values.

9. The method of claim 5 wherein the error check values are Yamamoto check values.

10. The method of claim 1 wherein the further steps carried out if exactly one of the error check values is positive, includes the further step of:

determining if the possible transmission rate corresponding to the error check value which was positive is the maximum of the possible transmission rates, and if so, generating a signal to indicate that the actual transmission rate is the maximum of the possible transmission rates.

11. The method of claim 10 wherein the error check values are cyclic redundancy check values.

12. The method of claim 10 wherein the error check values are Yamamoto check values.

13. The method of claim 10 wherein each of the thresholds is predetermined empirically based on a desired performance of the communication system, there being two such thresholds for each combination of possible transmission rates.

14. The method of claim 10 wherein the communication system is a code division multiple access communication system.

15. The method of claim 14 wherein the error rate values are symbol error rates.

16. The method of claim 14 wherein the error rate values are normalized symbol error rates.

17. The method of claim 14 wherein the error check values are cyclic redundancy check values.

18. The method of claim 14 wherein the error check values are Yamamoto check values.

19. A processor in a receiving system of a communication system, the communication system having a transmitting system which transmits a frame to the receiving system, the frame being transmitted at an actual transmission rate which is one of a plurality of possible transmission rates, the receiving system generating an error check value for each possible transmission rate and an error rate value for each possible transmission rate, the error check values and the error rate values being passed to the processor, and the processor containing instructions for:

determining whether exactly two of the error check values are positive, one error check value having a corresponding first error check rate and the other error check value having a corresponding second error check rate, and if so:
  determining whether the difference between the first error rate value and the second error rate value is less than a first predetermined threshold; and
  if the difference between the first error rate value and the second error rate value is less than the first predetermined threshold, generating a signal to indicate that the actual transmission rate is the possible transmission rate corresponding to the first error rate value, and otherwise:
    determining whether the difference between the first error rate value and the second error rate value is greater than a second predetermined threshold; and
    if the difference between the first error rate value and the second error rate value is greater than the second predetermined threshold, generating a signal to indicate that the actual transmission rate is the possible transmission rate corresponding to the second error rate value, and otherwise:
      generating a signal to erase the frame;
      if other than exactly two of the error check values are positive, determining whether exactly one of the error check values is positive, and if so:
        for each of the error rate values corresponding to an error check value which is negative, determining whether the difference between the error rate value corresponding to the error rate value which is positive and the error rate value corresponding to the error check value which is negative is less than a predetermined threshold particular to the two possible transmission rates corresponding to the error check value which is positive and the error check value which is negative; and
      if each difference between the error rate value corresponding to the error check value which is positive and an error rate value corresponding to an error check value which is negative is less than the predetermined threshold particular to the two corresponding rates, generating a signal to indicate that the actual transmission rate was the possible transmission rate corresponding to the error check value which was positive, and otherwise:
        generating a signal to erase the frame;
        if other than exactly two of the error check values are positive and other than exactly one of the error check values is positive, generating a signal to erase the frame.

20. The processor of claim 19 wherein the error check values are cyclic redundancy check values.

21. The processor of claim 19 wherein the error check values are Yamamoto check values.

22. The processor of claim 19 wherein the communication system is a code division multiple access communication system.

23. The processor of claim 22 wherein the error rate values are symbol error rates.

24. The processor of claim 22 wherein the error rate values are normalized:symbol error rates.

25. The processor of claim 22 wherein the error check values are cyclic redundancy check values.

26. The processor of claim 22 wherein the error check values are Yamamoto check values.

27. The processor of claim 19 wherein the instructions carried out if exactly one of the error check values is positive, further include:
  determining if the possible transmission rate corresponding to the error check value which was positive is the maximum of the possible transmission rates, and if so, generating a signal to indicate that the actual transmission rate is the maximum of the possible transmission rates.

28. The processor of claim 27 wherein the error check values are cyclic redundancy check values.

29. The processor of claim 27 wherein the error check values are Yamamoto check values.

30. The processor of claim 27 wherein the communication system is a code division multiple access communication system.

31. The processor of claim 30 wherein the error rate values are symbol error rates.

32. The processor of claim 30 wherein the error rate values are normalized symbol error rates.

33. The processor of claim 30 wherein the error check values are cyclic redundancy check values.

34. The processor of claim 30 wherein the error check values are Yamamoto check values.

35. In a communication system having a transmitting system which transmits a frame to a receiving system, the frame being transmitted at an actual transmission rate which is one of a plurality of possible transmission rates, the receiving system generating an error check value for each possible transmission rate and an error rate value for each possible transmission rate, the receiving system comprising:

means for determining whether exactly two of the error check values are positive, one error check value having a corresponding first error rate value and the other error check value having a corresponding second error check value;

means for determining whether the difference between the first error rate value and the second error rate value is less than a first predetermined threshold;

means for generating a signal to indicate that the actual transmission rate is the possible transmission rate corresponding to the first error rate value in the event that the difference between the first error rate value and the second error rate value is less than the first predetermined threshold;

means for determining whether the difference between the first error rate value and the second error rate value is greater than a second predetermined threshold in the even that the difference between the first error rate value and the second error rate value is greater than the first predetermined threshold;

means for generating a signal to indicate that the actual transmission rate is the possible transmission rate corresponding to the second error rate value in the event that the difference between the first error rate value and the second error rate value is greater than the second predetermined threshold;

means for generating a signal to erase the frame in the event that the difference between the first error rate value and the second error rate value is greater than the first predetermined threshold and is less than the second predetermined threshold;

means for determining whether exactly one of the error check values is positive;

means for determining whether the differences between the error rate value corresponding to the exactly one error check value and each of the error rate values corresponding to an error check value which was negative is greater than a predetermined threshold particular to the two possible transmission rates corresponding to the error check value which is positive and the error check value which is negative;

means for generating a signal to indicate that the actual transmission rate was the possible transmission rate corresponding to the exactly one error check value which was positive in the event that the differences between the error rate value corresponding to the exactly one error check value which was positive and each of the error rates values corresponding to an error check value which was negative was less than the predetermined threshold particular to the two corresponding rates;

means for generating a signal to erase the frame in the event that any of the differences between the error rate value corresponding to the exactly one error check value which was positive and an error rate value corresponding to an error check value which was negative is greater than the predetermined threshold particular to the two corresponding rates;

means for generating a signal to erase the frame in the event that other than exactly two of the error check values are positive and other than exactly one of the error check values is positive.

36. The receiving system of claim 35 further comprising:

means for determining if the possible transmission rate corresponding to the exactly one error check value which was positive is the maximum of the possible transmission rates; and means for generating a signal to indicate that the actual transmission rate is the maximum of the possible transmission rates in the event that the possible transmission rate corresponding to the exactly one error check value which was positive is the maximum of the possible transmission rates.

37. In a communication system having a transmitting system which transmits a frame to a receiving system, the frame being transmitted at an actual transmission rate which is one of a plurality of possible transmission rates, the receiving system generating an error check value for each possible transmission rate and an error rate value for each possible transmission rate, a method for determining at the receiving system the actual transmission rate comprising the steps of:

determining whether exactly two of the error check values are positive, and if so, the further steps of:

determining whether exactly two error check values are positive, one error check value having a corresponding first error check rate and the other error check value having a corresponding second error check rate, and if so, the further steps of:

determining whether the difference between the first error rate value and the second error rate value is less than a first predetermined threshold; and if the difference between the first error rate value and the second error rate value is less than the first predetermined threshold, generating a signal to indicate that the actual transmission rate is the possible transmission rate corresponding to the first error rate value, and otherwise, the further steps of:

determining whether the difference between the first error rate value and the second error rate value is greater than a second predetermined threshold; and if the difference between the first error rate value and the second error rate value is greater than the second predetermined threshold, generating a signal to indicate that the actual transmission rate is the possible transmission rate corresponding to the second error rate value, and otherwise, the further step of:

generating a signal to erase the frame.

38. In a communication system having a transmitting system which transmits a frame to a receiving system, the frame being transmitted at an actual transmission rate which is one of a plurality of possible transmission rates, the receiving system generating an error check value for each possible transmission rate and an error rate value for each possible transmission rate, a method for determining at the receiving system the actual transmission rate comprising the steps of:

determining whether exactly one of the error check values is positive, and if so, the further steps of:

for each of the error rate values corresponding to an error check value which is negative, determining whether the difference between the error rate value corresponding to the error rate value which is positive and the error rate value corresponding to the error check value which is negative is less than a predetermined threshold particular to the two possible transmission rates corresponding to the error check value which is positive and the error check value which is negative; and if each difference between the error rate value corresponding to the error check value which is positive and an error rate value corresponding to an error check value which is negative is less than the predetermined threshold particular to the two corresponding rates, generating a signal to indicate that the actual transmission rate was the possible transmission rate corresponding to the error check value which was positive, and otherwise, the further step of:

generating a signal to erase the frame.

39. The method of claim 38 wherein the further steps carried out if exactly one of the error check values is positive, includes the further step of:

determining if the possible transmission rate corresponding to the error check value which was positive is the maximum of the possible transmission rates, and if so, generating a signal to indicate that the actual transmission rate is the maximum of the possible transmission rates.

* * * * *